United States Patent
Kean et al.

(10) Patent No.: US 8,218,557 B2
(45) Date of Patent: Jul. 10, 2012

(54) SCALABLE DISTRIBUTED USER PLANE PARTITIONED TWO-STAGE FORWARDING INFORMATION BASE LOOKUP FOR SUBSCRIBER INTERNET PROTOCOL HOST ROUTES

(75) Inventors: Brian R. Kean, Cincinnati, OH (US); Chandramouli Balasubramanian, Mountain View, CA (US); Staffan Bonnier, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 271 days.

(21) Appl. No.: 12/757,820

(22) Filed: Apr. 9, 2010

(65) Prior Publication Data

US 2011/0249682 A1 Oct. 13, 2011

(51) Int. Cl.
 *H04L 12/56* (2006.01)
(52) U.S. Cl. ........................................ 370/401; 370/230
(58) Field of Classification Search .......... 370/230–231, 370/351, 395.31, 395.32, 389, 400, 401, 370/704, 422
See application file for complete search history.

(56) References Cited

U.S. PATENT DOCUMENTS

| | | | |
|---|---|---|---|
| 6,445,922 B1 * | 9/2002 | Hiller et al. | 455/433 |
| 6,567,377 B1 | 5/2003 | Vepa et al. | |
| 6,580,712 B1 * | 6/2003 | Jennings et al. | 370/392 |
| 6,735,206 B1 * | 5/2004 | Oki et al. | 370/395.32 |
| 7,099,325 B1 * | 8/2006 | Kaniz et al. | 370/392 |
| 7,236,493 B1 * | 6/2007 | McRae | 370/392 |
| 7,325,074 B2 * | 1/2008 | McRae | 709/242 |
| 7,515,592 B2 * | 4/2009 | Shankar et al. | 370/395.31 |
| 7,554,993 B2 * | 6/2009 | Modi et al. | 370/401 |
| 7,616,646 B1 | 11/2009 | Ma et al. | |
| 2009/0116513 A1 | 5/2009 | Gray et al. | |

* cited by examiner

*Primary Examiner* — Ayaz Sheikh
*Assistant Examiner* — Mounir Moutaouakil
(74) *Attorney, Agent, or Firm* — Blakely Sokoloff Taylor & Zafman, LLP

(57) ABSTRACT

Communication sessions are each homed on one of a plurality of line cards in a network element. Packets received by the network element are processed on the home card before being transmitted to a subscriber device, such as a mobile phone or laptop computer. When a packet is received by the network element, it is not necessarily received by the line card that serves as a home card for the respective session. The packet is switched within the network element from the receiving line card, i.e., the trunk card, to the home card. The network element identifies the home card by performing a lookup in a table duplicated on all the line cards using the least significant bits of the IP address in the packet. Using these bits to organize the table limits the size of the table and balances load among the line cards.

17 Claims, 6 Drawing Sheets

SCALABLE DISTRIBUTED USER PLANE PARTITIONED TWO-STAGE FORWARDING INFORMATION BASE LOOKUP FOR SUBSCRIBER INTERNET PROTOCOL HOST ROUTES

BACKGROUND

1. Field

Embodiments of the invention relate to the field of IP (Internet Protocol) communications; and more specifically, to the routing of packets in a CPG (Converged Packet Gateway).

2. Background

Subscriber devices such as mobile devices and laptop computers connect to the Internet to gain access to web pages, e-mail, etc. Each of these subscriber devices is dynamically allocated an IP host address, either from a CPG local IP pool or a RADIUS provided IP pool. The CPG is a distributed user plane system positioned at the edge of the network and facilitates the IP connectivity to these subscriber devices. Packets are routed between the Internet and the appropriate subscriber device via the CPG.

When a CPG receives packets transmitted from the Internet, it routes it to the line card in the home slot, which is the card that homes the wireless session for that packet. Services are executed on the packet at the home slot before the packet is routed to the intended subscriber device. When a packet is received by the CPG for a subscriber device destination, the manner in which a home slot is located is done using the FIB (Forwarding Information Base) of a line card.

One embodiment of an FIB is depicted in FIG. 2A. This FIB is duplicated on every line card of the forwarding plane of the CPG. An incoming packet will contain an IP address that identifies the destination subscriber device. In the FIB, each of the IP addresses are mapped to a line card on the forwarding plane of the CPG. These line cards indicate that they are home cards for the respective sessions associated with the packets. To illustrate, the IP address column 305 of the FIB lists the IP addresses that identify current or potential subscriber devices. The line card number column 310 of the FIB lists the line card number identifying the line cards on the forwarding plane of the CPG. For example, when a packet that contains IP address 128.1.1.7 is received by an initial line card on the CPG, the line card looks in its FIB to see that the home card for this packet is line card #1. Therefore, if the initial line card that received the packet is line card #1, the packet is already on the home card. Otherwise, the packet is forwarded from the initial line card to line card #1 for further processing before being routed out to the subscriber device identified by IP address 128.1.1.7. Similarly, an incoming packet with IP address 128.1.1.8 will be routed to line card #2 and an incoming packet with IP address 128.1.1.9 will be routed to line card #3. While this format of FIB is effective in routing packets to their respective home cards, a CPG that supports millions of subscribers requires millions of entries for each of the IP addresses. This would consume a large amount of resources to store and locate entries in the FIB. While scalability is a bonus, line card failure recovery is more important. The home card table can be fixed quickly.

Another embodiment of the FIB is illustrated in FIG. 2B. This FIB is duplicated on every line card of the forwarding plane of the CPG. Rather than having an entry for each individual IP address, the FIB in FIG. 2B identifies an entry for each IP address range 315. Each range of IP address is mapped to a home card identified by a line card number 320. This reduces the size of the FIB because a single entry for IP address 128.1.1.X covers the 256 32-bit IP addresses ranging from 128.1.1.0 through 128.1.1.255. For example, when a packet initially arrives on a line card at the CPG with IP address 128.1.1.7, the FIB indicates that the home card is line card #1. If the initial line card that received the packet is line card #1, the packet is already on the home card. Otherwise, the packet is forwarded from the initial line card to line card #1 for further processing before being routed out to the subscriber device identified by IP address 128.1.1.7. As shown in the illustration, IP addresses of 128.1.3.X are mapped to line card #2 and IP addresses of 128.1.4.X are mapped to line card #3. Compared to the FIB in FIG. 2A, the FIB in FIG. 2B has fewer entries due to the grouping of IP addresses. However, the FIB in FIG. 2B is still large and furthermore, the effect of this grouping is that all 256 consecutive IP addresses are mapped to one line card, causing "clumps" of traffic at certain line cards.

SUMMARY

This invention is directed to an improved FIB lookup technique. The FIB directs the lookup to a separate load distribution table, a home card table, to identify the home card. The home card table is organized by index value rather than IP address or IP address range as in FIGS. 2A and 2B. The index value represents the last bits of the IP address identified in the packet and is mapped to a home card identified by line card number in the home card table. In one embodiment, the IP address identifies the destination. This grouping is different from the grouping in FIG. 2B because using the last bits of the IP address avoids the clumps that result in mapping consecutive IP address values to a home card. Also since it does not use the FIB we have scalability and line card failure resilience.

A network element that implements this embodiment includes a plurality of slots holding different ones of the plurality of line cards. The network element receives packets that contain an IP address. The line cards that receive the packets act as trunk cards for those respective packets. Each of the plurality of line cards includes a FIB and a home card table.

The FIB contains instructions to perform lookups in a home card table on that line card using a subset of the IP addresses of the received packets, wherein the subsets include a least significant portion of the IP addresses. The home card table contains a mapping of each value represented by the subsets to one of the plurality of line cards to act as a home card, whereby the home card table identifies one of the line cards to act as the home card for each of the communication sessions based on the subset of the IP address in the packets for that communication session. Services for execution on the packets of each of the communication sessions are only on the home card to which that communication session was mapped. Using the subset of the IP address rather than groups of sequential IP address ranges allows for improved load balancing of the communication sessions across the plurality of line cards by supporting more even distribution of packet processing load across processing resources of the plurality of line cards.

A method of the network element for routing packets to home cards comprises the steps of receiving different ones of the packets at different ones of the plurality of line cards in the network element, wherein each of the packets contains an IP address. The line cards that receive the packets act as trunk cards for those respective packets. The network element performs the following steps for each of the packets. The network element performs a first lookup in an FIB stored on the packet's trunk card using the packet's IP address. A result of the first lookup specifies a second lookup to be performed using a subset of the IP address, wherein the subset includes a least significant portion of the IP address. The network element performs the second lookup in a home card table stored on the packet's trunk card using the specified subset of the IP address to identify the line card from the plurality of line cards that acts as a home card for the packet's communication session. The home card for the packet's communication session is the only line card that contains services for execution on the packet and the home card table identifies the home card for each of the communication sessions based on the subset of the IP address in the packets for that communication session. Using the subset of the IP address rather than groups of sequential IP address ranges allows for improved load balancing of the communication sessions across the plurality of line cards by supporting more even distribution of packet processing load across processing resources of the plurality of line cards. If the identified home card is different from the trunk card, the network element forwards the packet from the trunk card to the home card identified by the home card table. Otherwise, if the trunk card is the home card, the packet is already at the home card. The network element executes the services on the packet at the home card according to a suffix FIB table on the home card before releasing the packet to the destination.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
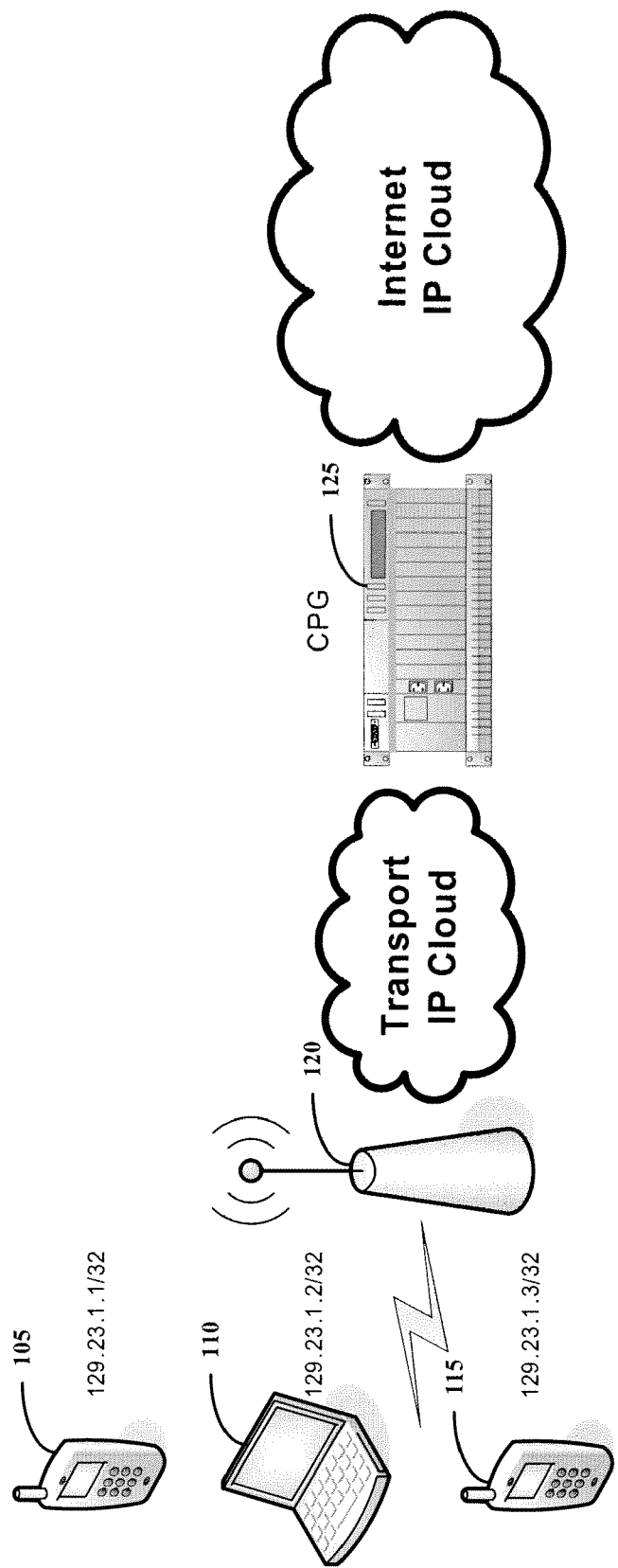
FIG. 1 illustrates an exemplary computer system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network device or element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements include functionality for AAA (authentication, authorization, and accounting) protocols (e.g., RADIUS (Remote Authentication Dial-In User Service), Diameter, and/or TACAS+ (Terminal Access Controller Access Control System). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, ATM, etc. A subscriber session can be initiated using a variety of mechanisms: manual provisioning a dynamic host configuration protocol (DHCP), DHCP/client-less internet protocol service (CLIPS), Media Access Control (MAC) address tracking, etc. For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Certain network elements (e.g., certain edge network elements) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end stations to the network element. These parent circuits may represent physical or logical aggregations of subscriber circuits (e.g., a virtual local area network (VLAN), a private virtual circuit (PVC) (e.g., for Asynchronous Transfer Mode (ATM)), a circuit-group, a channel, a pseudo-wire, a physical port of the network element, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical ports for purposes of bandwidth aggregation and redundancy. Thus, the parent circuits physically or logically encapsulate the subscriber circuits.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

FIG. 1 illustrates an exemplary computer system according to one embodiment of the invention. This figure depicts a network where subscriber devices including mobile phone 105, laptop computer 110, and mobile phone 115 are on wireless connections to the Internet. A communication session is a semi-permanent interactive information exchange involving at least one of the subscriber devices. Subscriber devices 105, 110, 115 communicate with access point 120, which communicates with CPG 125. Ports of CPG 125 that interface with the Internet IP cloud are referred to as trunk interfaces and ports of CPG 125 that interface with the transport IP cloud are referred to as access interfaces.

Packets received by CPG 125 on a trunk interface from the Internet IP cloud are routed and processed in CPG 125 prior to being transmitted on an access interface out to access point 120 and to the intended subscriber device. These packets contain a 32-bit IP address that identifies the destination. In this example, mobile device 105 is identified by IP address 129.23.1.1, laptop computer 110 is identified by IP address 129.23.1.2, and mobile device 115 is identified by IP address 129.23.1.3. When packets arrive at CPG 125 from the Internet IP cloud, the line card it arrives on is referred to as a trunk card. However, the trunk card may not necessarily contain the services needed to process the incoming packet because only one line card, i.e., the home card, contains these services. A lookup is performed in the CPG to determine which of the line cards acts as the home card for the session that contains these services and the packet is forwarded to the line card that is the home card. Services are applied to the packet at the home card and the packet is sent out of CPG 125 on an access interface to access point 120, then routed to the destination, whether it be mobile phone 105, laptop computer 110, or mobile phone 115.

Figure 3:
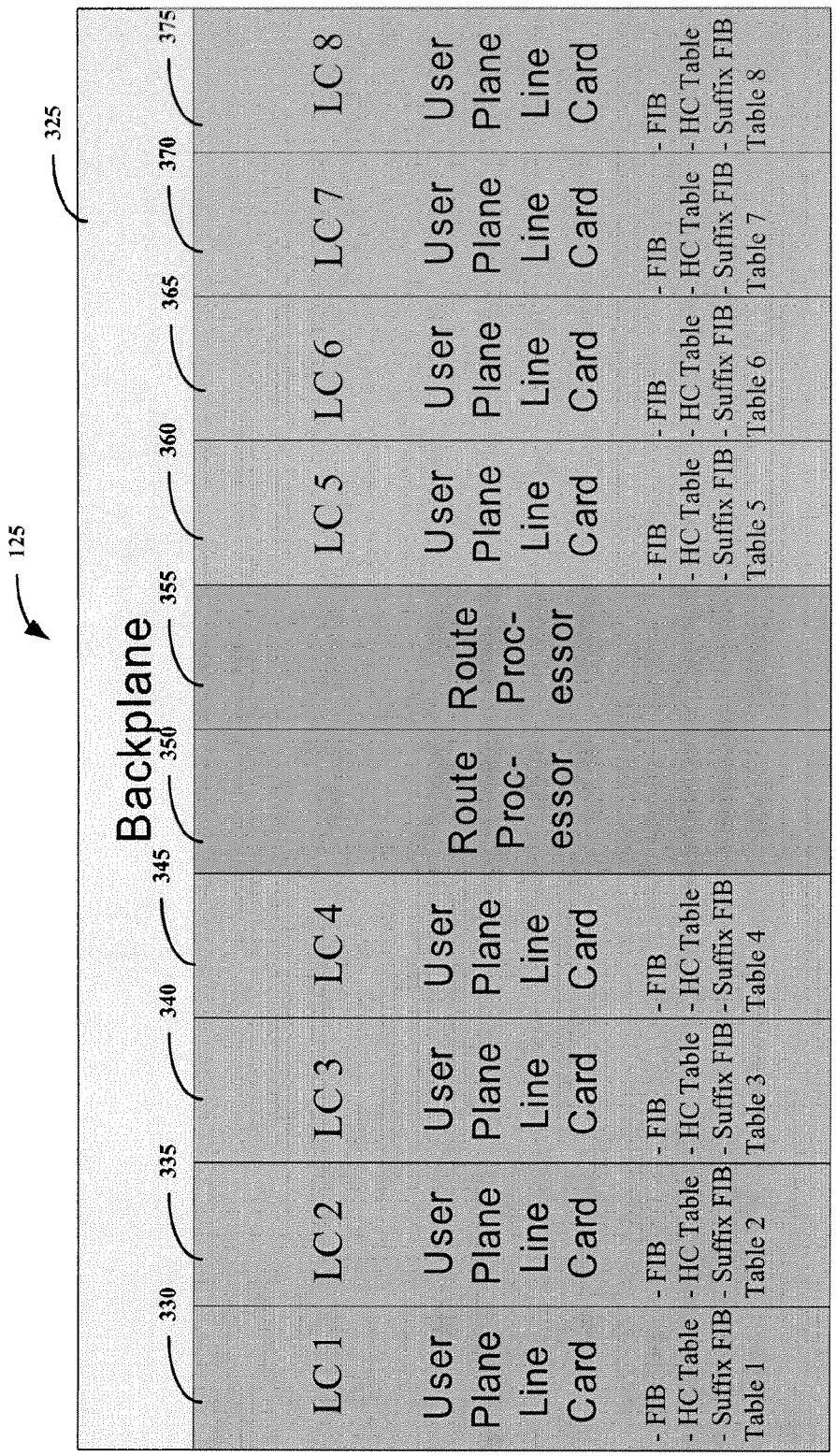
FIG. 3 illustrates an exemplary network device according to one embodiment of the invention.

FIG. 3 illustrates an exemplary network device according to one embodiment of the invention. CPG 125 includes a chassis with line card slots for redundant control path route processor cards 350, 355 and user plane line cards 330, 335, 340, 345, 360, 365, 370, 375. Backplane 325 operates to forward packets from one line card to another line card, such as from trunk card to home card.

The control path route processor cards 350, 355 initialize and maintain the information in user plane line cards 330, 335, 340, 345, 360, 365, 370, 375. Each of user plane line cards 330, 335, 340, 345, 360, 365, 370, 375 include a FIB, home card table, and a suffix FIB table. The FIB and home card table in each of user plane line cards 330, 335, 340, 345, 360, 365, 370, 375 are identical. When a packet is received by one of user plane line cards 330, 335, 340, 345, 360, 365, 370, 375, the first lookup occurs in that line card's FIB. The FIB directs the lookup to the same line card's home card table, which identifies which of user plane line cards 330, 335, 340, 345, 360, 365, 370, 375 is the home card. The home card tables support effective load balancing of sessions across the line cards. The packet is forwarded to the line card identified as the home card. The suffix FIB table is unique for each of user plane line cards 330, 335, 340, 345, 360, 365, 370, 375. The suffix FIB table for a particular user plane line card 330, 335, 340, 345, 360, 365, 370, 375 contains only those entries for wireless subscribers homed on that line card to locate the wireless subscriber's session state. Once the session state is located, user plane services are executed on that packet before the packet is transmitted out the access interface of CPG 125 and to the wireless subscriber, e.g., the mobile phone or laptop computer as shown in FIG. 1.

IP pool provisioning occurs as follows. At initialization, the IP pool is configured in the correct routing instance. The IP pool may be provided by RADIUS, but IP subnets in the IP pool are pre-configured in CPG 125. Each of the IP subnets within the IP pool are added to route processor's 350, 355 IP routing table instance. One route processor control card is sufficient, but the other is added for redundancy. The route processor 350, 355 sends the IP pool subnet routes to each user plane line card 330, 335, 340, 345, 360, 365, 370, 375. Each of these user plane line cards 330, 335, 340, 345, 360, 365, 370, 375 creates an IP pool FIB leaf. FIB routes for each IP subnet refer to the IP pool FIB leaf.

Allocation of an IP pool host address to a wireless session proceeds as follows. Route processor 350, 355 allocates an IP pool host address for the wireless session as the user of the subscriber device attaches to the network. The address can be allocated locally or by RADIUS. Then, route processor 350, 355 sends the IP host address to the wireless session, binding provisioning information only to the session's home card, which is one of user plane line cards 330, 335, 340, 345, 360, 365, 370, 375. The line card that acts as the home card extracts the routing table ID and IP host address from the provisioning information and adds an entry into its suffix FIB table. Accordingly, the suffix FIB table is unique for each line card as it corresponds only to the sessions homed at that line card. When a wireless session is detached, the procedures is reversed, freeing the IP host address back into the IP pool and deleting the entry from the line card's suffix FIB table at the home slot. In other words, the subscriber device session s releasing is IP address as it is no longer communicating on the Internet.

Figure 4:
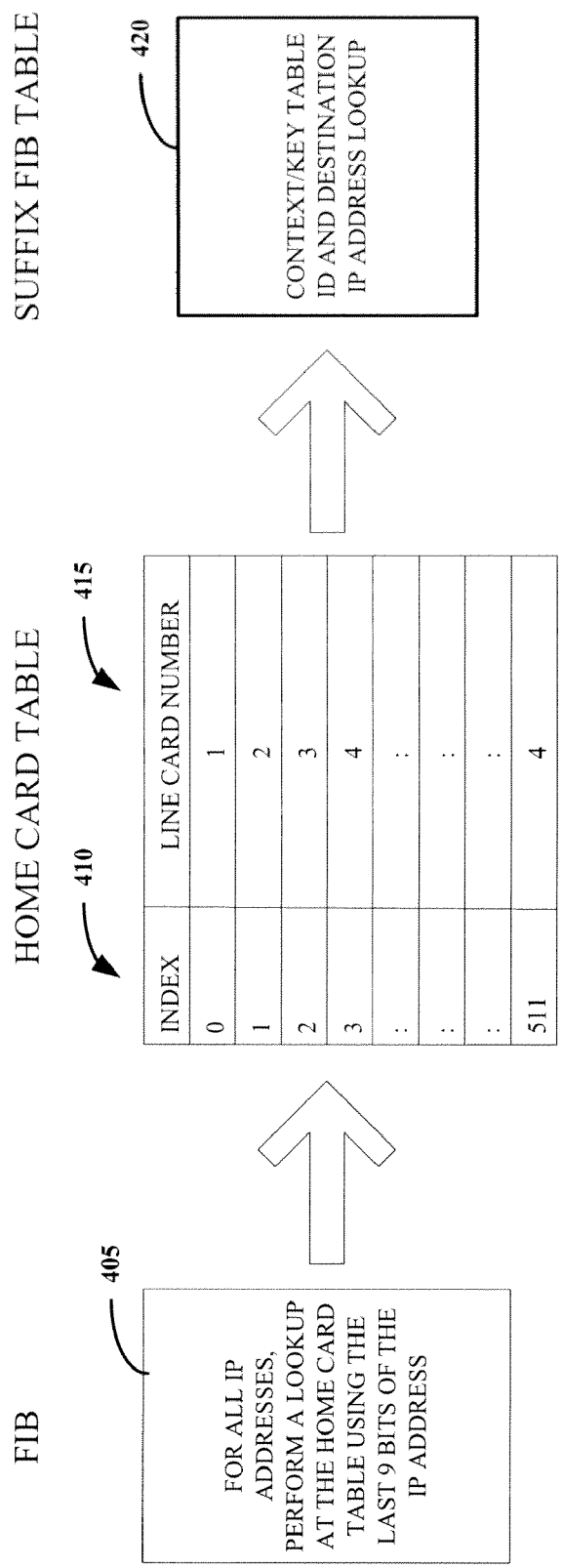
FIG. 4 illustrates an exemplary FIB, home card table, and suffix FIB table in a line card according to one embodiment of the invention.

FIG. 4 illustrates an exemplary FIB, home card table, and suffix FIB table in a line card according to one embodiment of the invention. The FIB lookup of the prior art is converted to a two-stage lookup; the first lookup uses the FIB and the second lookup uses the home card table. When line cards fail, the home card table on each of the line cards will be adjusted so that the failed line card is covered by other line cards, but FIB 405 can remain the same. Avoiding changes to FIB 405 is desirable because the home card table is simpler than FIB 405 and can be adjusted to reflect new home card assignments more quickly than FIB 405. In one embodiment, each of the line cards can autonomously adjust their respective home card tables based on the RP provisioning backup line cards. The only data lost is during failure detection of the line card.

When the CPG receives a packet on the trunk interface, it lands on one of the line cards. That line card uses an IP address in the packet for a lookup in FIB 405 of the line card. The IP address identifies one of the destination subscriber devices. As a result, FIB 405 indicates that a further lookup should be performed using a home card table in the line card using the last subset of bits in the IP address as an index value. In one embodiment, the index value is the least significant 9 bits of a 32 bit IP address. The home card table maps index values 410 to home cards identified by line card number 415. A 9 bit value results in 512 possible index values, ranging from binary 000000000 (decimal 0) to binary 111111111 (decimal 511). Thus, packets with IP address ending in 000000000 should be forwarded to line card #1, packets with IP address ending in 000000001 should be forwarded to line card #2, etc. Since consecutive IP addresses map to different home cards, the clumping effect of the prior art's IP address range mapping is avoided. Furthermore, regardless of how many IP addresses there are, only 512 index values are tracked in the home card table. In other embodiments, a fewer or greater number of bits can be taken from the end of the IP address to serve as the index value. The index values can be a fixed, finite number of values substantially less than the number of destination IP-addresses for which forwarding is enabled on the trunk side. Alternatively, the index values represent other pre-defined mappings of IP addresses.

Figures 2A, 2B:
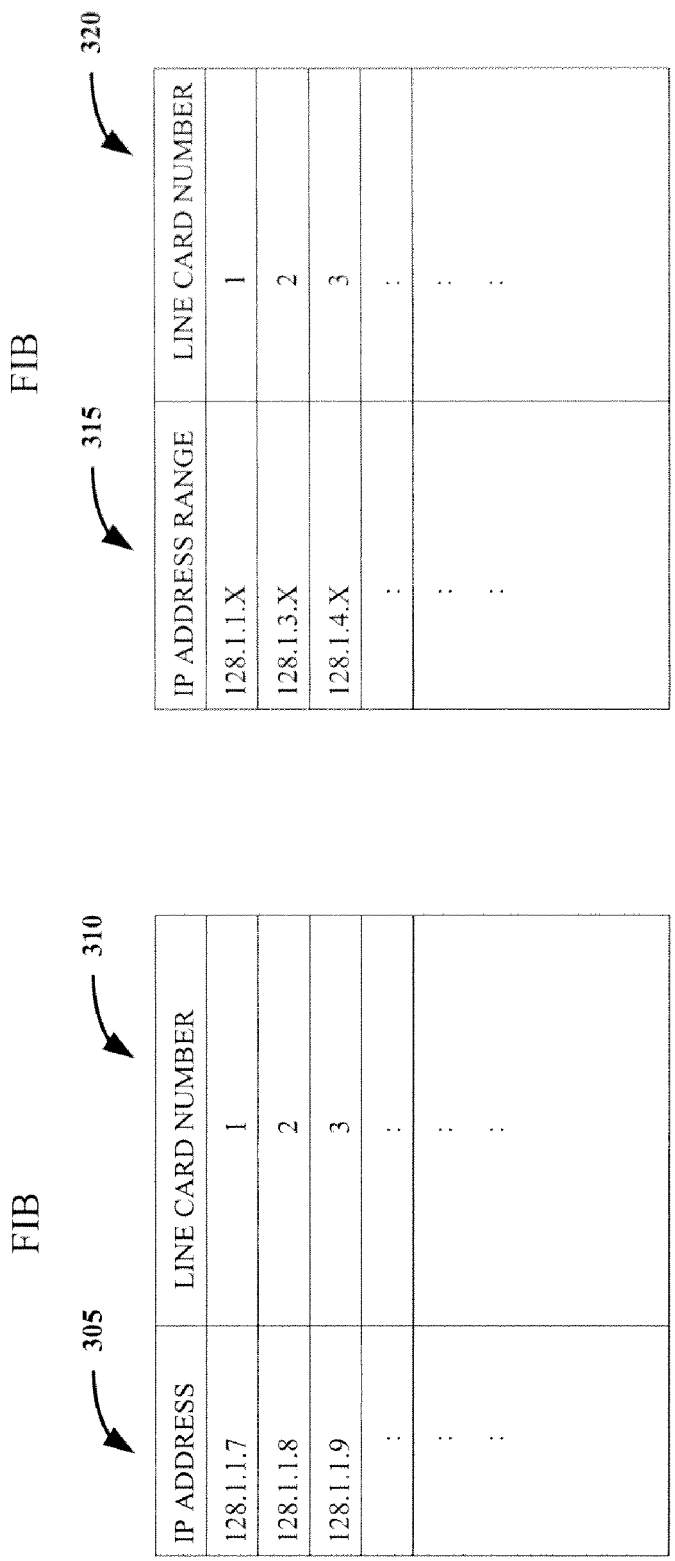
FIG. 2A illustrates an exemplary FIB of a line card in the prior art.
FIG. 2B illustrates an exemplary FIB of a line card in the prior art.

In one embodiment, the home card table also includes a backup entry. For each subset or load index value, the home card table includes an active entry and a backup entry. The line cards find out about each other's faults very quickly, and therefore the home card table can also be changed very quickly due to line card failures. Thus, beyond scalability, the feature of these backup entries offer an advantage in terms of time to update over the prior art of FIG. 2B. The FIB would take longer to modify compared to the home card table. After the packet is routed to the home card, suffix FIB table 420 provides the information needed to further process and route the card according to a context/key table ID and destination IP address lookup.

Figure 5:
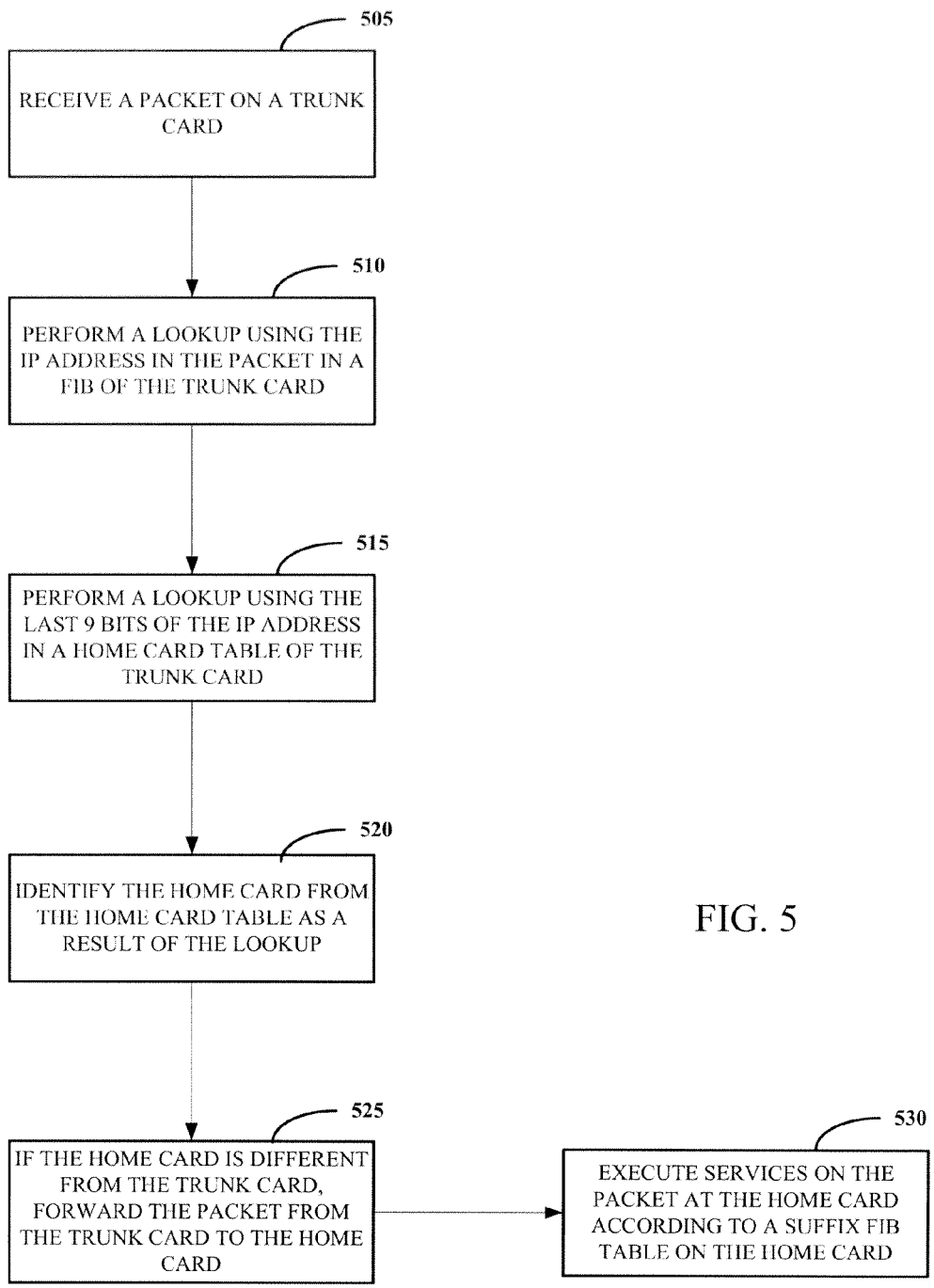
FIG. 5 is a data flow diagram of a network device according to one embodiment of the invention.

FIG. 5 is a data flow diagram of a network device according to one embodiment of the invention. The operations of FIG. 5 will be described with reference to the exemplary embodiment of FIGS. 3 and 4. However, it should be understood that the operations of flow diagrams can be performed by embodiments of the invention other than those discussed with reference to FIGS. 3 and 4, and the embodiments discussed with reference to FIGS. 3 and 4 can perform operations different than those discussed with reference to the flow diagrams. This diagram sets forth the steps taken by CPG 125 from the time a packet is received on a trunk card of CPG 125 to the time the packet leaves out of the home card of CPG 125.

Beginning with operation 505, CPG 125 receives a packet from an Internet IP cloud by a line card which acts as a trunk card. At operation 510, CPG 125 performs a lookup using an IP address in the packet in a FIB of the trunk card. This lookup indicates that a further lookup is required in a home card table of the trunk card. At operation 515, CPG 125 performs this further lookup using the last or least significant bits of the IP address in the packet in the home card table of the trunk card. In one embodiment, the last 9 bits of the IP address are used for the lookup. At operation 520, the lookup in the home card table using the last 9 bits identifies the home card, which may or may not be the same line card as the trunk card. If the home card happens to be the trunk card, then the packet is already at the home card. If the home card is a different line card than the trunk card, then CPG 125, via backplane 325, forward the packet from the trunk card to the home card (operation 525). At the home card, CPG 125 executes services on the packet according to a suffix FIB table on the home card that locates the session state (operation 530). Therefore, the suffix FIB table is different on each line card as it only contains information for sessions that it homes.

Figure 6:
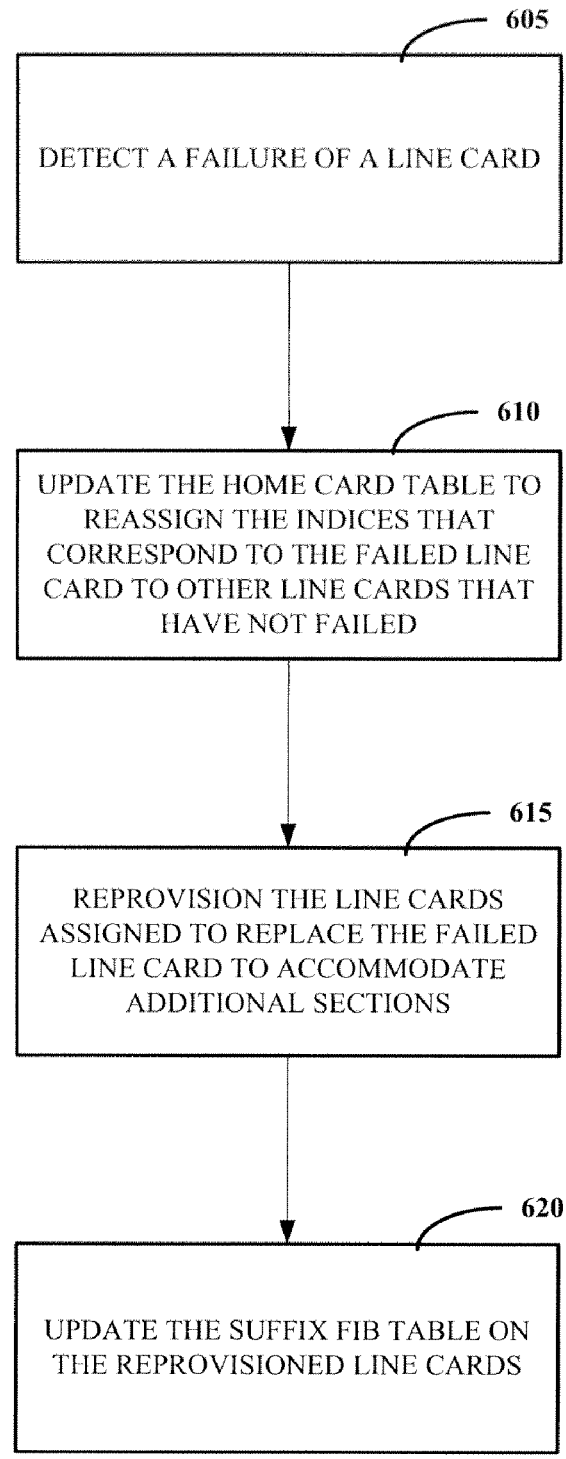
FIG. 6 is a data flow diagram of a network device according to one embodiment of the invention.

FIG. 6 is a data flow diagram of a network device according to one embodiment of the invention. The operations of FIG. 6 will be described with reference to the exemplary embodiment of FIGS. 3 and 4. However, it should be understood that the operations of flow diagrams can be performed by embodiments of the invention other than those discussed with reference to FIGS. 3 and 4, and the embodiments discussed with reference to FIGS. 3 and 4 can perform operations different than those discussed with reference to the flow diagrams. This diagram sets forth the steps taken when one of the line cards in CPG 125 fails.

At operation 605, CPG 125 detects a failure of a line card. This is a problem because that line card likely homed sessions and subsequent packets would be rerouted to that failed home card. Thus, at operation 610, CPG 125, by way of one of the route processor control cards 350, 355, updates the home card table on each of the line cards to reassign the indices that correspond to the failed line card to other line cards that have not failed. For example, looking at FIG. 4, if line card #4 failed, both index 3 and index 511, as well as any other indices mapped to line card #4, would need to be reassigned to other line cards. The distribution can be divided so as not to overload any one particular line card. For example, index 3 can be reassigned to line card #2 and index 511 can be reassigned to line card #3. Therefore, line card #2 now serves as the home card for index 3 and line card #3 now serves as the home card for index 511.

Since the home card tables are now altered with different information, the line cards that replace the failed line card have to be reprovisioned to support the services formerly covered by the failed line card. At operation 615, CPG 125, by way of one of the route processor control cards 350, 355, reprovisions the line cards assigned to replace the failed line card to accommodate additional sessions. These line cards now home more services than before. Since the suffix FIB table locates the sessions, CPG 125 also updates the suffix FIB table on the reprovisioned line cards (operation 620). However, if a particular line card was not called upon to serve as a replacement for the failed line card, then the suffix FIB table on this line card would not need to be updated. However, the home card table on this line card would need to be updated to reflect the new mapping. In another embodiment, one or more line cards can serve as backup line cards. Services on the non-backup line cards can also be pre-provisioned on the backup line cards. Accordingly, upon a line card failure, since the services are already pre-provisioned on the backup line cards, the backup line cards can quickly take over and only the home card table would need to be updated. Thus, switchover of line cards to handle a line card failure can occur extremely quickly.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for routing packets received at a plurality of line cards for a plurality of communication sessions distributed over the plurality of line cards in a network element, wherein different ones of the packets are transmitted to the network element for different ones of the communication sessions, wherein each of the communication sessions is a semi-permanent interactive information exchange involving at least one of a plurality of subscriber devices, comprising the steps of:

receiving different ones of the packets at different ones of the plurality of line cards in the network element, wherein each of the packets contains an IP (Internet Protocol) address, and wherein the line cards that receive the packets act as trunk cards for those respective packets;

performing the following steps for each of the packets:
performing a first lookup in an FIB (forwarding information base) stored on the packet's trunk card using the packet's IP address, wherein a result of the first lookup specifies a second lookup to be performed using a subset of the IP address, wherein the subset includes a least significant portion of the IP address;
performing the second lookup in a home card table stored on the packet's trunk card using the specified subset of the IP address to identify the line card from the plurality of line cards that acts as a home card for the packet's communication session, wherein the home card for the packet's communication session is the only line card that contains services for execution on the packet, wherein the home card table identifies the home card for each of the communication sessions based on the subset of the IP address in the packets for that communication session, and whereby using the subset of the IP address rather than groups of sequential IP address ranges allows for improved load balancing of the communication sessions across the plurality of line cards by supporting more even distribution of packet processing load across processing resources of the plurality of line cards;
if the identified home card is different from the trunk card, forwarding the packet from the trunk card to the home card identified by the home card table; and
executing the services on the packet at the home card according to a suffix FIB table on the home card before releasing the packet to the destination.

2. The method of claim 1, wherein the IP address identifies a destination at a subscriber device for the packet.

3. The method of claim 1, wherein the subset of the IP address is the last 9 bits of the IP address, whereby using nine bits yields 512 different values that map to one or more home cards.

4. The method of claim 1, further comprising the steps of:
detecting a failure of one of the plurality of line cards, wherein the failed line card acts as a home card for at least one of the communication sessions;
updating the home card table on each of the plurality of line cards other than the failed line card to reassign the subset of the IP address that maps to the failed line card to one or more of the remaining line cards that have not failed;
reprovisioning the one or more line cards that have been reassigned to replace the failed line card by loading the communication sessions previously serviced by the failed line cards onto the replacement line cards; and
updating the suffix FIB table on each of the reprovisioned line cards to reflect the newly loaded communication sessions, wherein the failure of the line card does not affect the FIB on any of the plurality of line cards.

5. The method of claim 4, wherein the failure of one of the plurality of line cards is detected by another one of the plurality of line cards.

6. The method of claim 1, wherein the FIB is identical on each of the plurality of line cards.

7. The method of claim 6, wherein the home card table is identical on each of the plurality of line cards.

8. The method of claim 7, wherein there are multiple home cards and each suffix FIB table is different to correspond to the services provided by that home card.

9. A network element for routing packets received at a plurality of line cards for a plurality of communication sessions distributed over the plurality of line cards, wherein different ones of the packets are transmitted to the network element for different ones of the communication sessions, wherein each of the communication sessions is a semi-permanent interactive information exchange involving at least one of a plurality of subscriber devices, comprising:
a plurality of slots holding different ones of the plurality of line cards, wherein the packets each contain an IP (Internet Protocol) address, and wherein the line cards that receive the packets act as trunk cards for those respective packets, wherein each of the plurality of line cards includes:
a FIB (forwarding information base) that contains instructions to perform lookups in a home card table on that line card using a subset of the IP addresses of the received packets, wherein the subsets include a least significant portion of the IP addresses; and
the home card table that contains a mapping of each value represented by the subsets to one of the plurality of line cards to act as a home card, whereby the home card table identifies one of the line cards to act as the home card for each of the communication sessions based on the subset of the IP address in the packets for that communication session, wherein services for execution on the packets of each of the communication sessions are only on the home card to which that communication session was mapped, and whereby using the subset of the IP address rather than groups of sequential IP address ranges allows for improved load balancing of the communication sessions across the plurality of line cards by supporting more even distribution of packet processing load across processing resources of the plurality of line cards.

10. The network element of claim 9, wherein the IP address identifies a destination at one of the plurality of subscriber devices for the packet.

11. The network element of claim 9, wherein the subset of the IP address is the last 9 bits of the IP address, whereby using nine bits yields 512 different values that map to one or more home cards.

12. The network element of claim 9, further comprising:
a suffix FIB table that contains the services to be executed on the packets of the communication sessions mapped, if any, to this line card, wherein the services are executed before the network element releases the packets to one of the plurality of subscriber devices.

13. The network element of claim 12, further comprising:
an additional plurality of slots holding a plurality of control cards to detect a failure of one of the plurality of line cards, wherein the failed line card acts as a home card for at least one of the communication sessions, to update the home card table on each of the plurality of line cards other than the failed line card to reassign the subset of the IP address that maps to the failed line card to one or more of the remaining line cards that have not failed, to reprovision the one or more line cards that have been reassigned to replace the failed line card by loading the communication sessions previously serviced by the failed line cards onto the replacement line cards, and to update the suffix FIB table on each of the reprovisioned line cards to reflect the newly loaded communication sessions, wherein the failure of the line card does not affect the FIB on any of the plurality of line cards.

14. The network element of claim 13, wherein the failure of one of the plurality of line cards is detected by another one of the plurality of line cards.

15. The network element of claim 12, wherein the suffix FIB table is different on different home cards.

16. The network element of claim 9, wherein the FIB is identical on each of the plurality of line cards.

17. The network element of claim 16, wherein the home card table is identical on each of the plurality of line cards.

* * * * *

UNITED STATES PATENT AND TRADEMARK OFFICE
CERTIFICATE OF CORRECTION

PATENT NO. : 8,218,557 B2
APPLICATION NO. : 12/757820
DATED : July 10, 2012
INVENTOR(S) : Kean et al.

It is certified that error appears in the above-identified patent and that said Letters Patent is hereby corrected as shown below:

On the Face Page, in Field (58), under "Field of Classification Search", in Column 1, Line 3, delete "370/704," and insert -- 370/407, --, therefor.

Signed and Sealed this
Ninth Day of October, 2012

David J. Kappos
*Director of the United States Patent and Trademark Office*